(12) United States Patent
Blaszczynski et al.

(10) Patent No.: US 8,290,168 B2
(45) Date of Patent: Oct. 16, 2012

(54) AUDIO BROADCAST PROCESSING METHOD

(75) Inventors: Luke S. Blaszczynski, Commerce Township, MI (US); Ron P. Mastropietro, Highland, MI (US); Patrick Dennis, Northville, MI (US)

(73) Assignee: Nissan North America, Inc., Franklin, TN (US)

( * ) Notice: Subject to any disclaimer, the term of this patent is extended or adjusted under 35 U.S.C. 154(b) by 312 days.

(21) Appl. No.: 12/723,273

(22) Filed: Mar. 12, 2010

(65) Prior Publication Data

US 2011/0222704 A1    Sep. 15, 2011

(51) Int. Cl.
*H04R 29/00* (2006.01)
*H04B 15/00* (2006.01)

(52) U.S. Cl. .................... 381/58; 381/94.1
(58) Field of Classification Search ............ 381/58, 381/59, 1, 2, 13, 77, 94.1–94.2
See application file for complete search history.

(56) References Cited

U.S. PATENT DOCUMENTS

| | | | | |
|---|---|---|---|---|
| 3,005,094 A | * | 10/1961 | Taylor | 455/202 |
| 5,253,298 A | * | 10/1993 | Parker et al. | 381/13 |
| 5,862,455 A | * | 1/1999 | Martin et al. | 455/67.7 |

OTHER PUBLICATIONS

"Analytic Hierarchy Process", Wikipedia, http://en.wikipedia.org/wiki/Analytic_Hierarchy_Process ; Feb. 15, 2010; 14 pages.

* cited by examiner

*Primary Examiner* — Ping Lee
(74) *Attorney, Agent, or Firm* — Global IP Counselors, LLP

(57) ABSTRACT

An audio broadcast processing method includes a plurality of steps. One step involves processing an audio broadcast having at least one occurrence of signal degradation that adversely affects audio quality of a corresponding segment of the audio performance. Another step involves modifying the segment of the audio performance with a plurality of differing signal degradation compensation factors to selectively compensate for the at least one occurrence of signal degradation to produce a plurality of compensated audio performances. Another step involves evaluating the compensated audio performances. Still another step involves determining at least one preferred signal degradation compensation factor based on data from the evaluating of the compensated audio performances. Yet another step includes configuring an audio device with the at least one preferred processing factor.

16 Claims, 11 Drawing Sheets

AUDIO BROADCAST PROCESSING METHOD

BACKGROUND

1. Field of the Invention

The present invention generally relates to an audio broadcasting processing method. More specifically, the present invention relates to an audio broadcasting processing method in which differing signal degradation compensation factors are applied to a segment of an audio performance produced from a broadcast signal that has experienced signal degradation. The differing signal degradation compensation factors are compared for effectiveness.

2. Background Information

The audio systems in vehicles typically include a tuner, an amplification section and speakers. The tuner receives a broadcast signal that includes an audio broadcast. The tuner receives the broadcast signal and transforms the audio broadcast into an audio performance that is amplified by the amplification section. The amplification section then projects the audio performance through the speakers for the passenger's enjoyment.

As the vehicle moves along a highway or road, there are often obstacles that interfere with the reception by the tuner of the broadcast signal. Such interference can sometimes cause signal degradation. A segment of the audio performance can be affected by the signal degradation. Specifically one or more segments of the audio performance can be negatively affected, altered or changed by the loss of signal (signal degradation).

SUMMARY

It has been discovered that differing groups of listeners have differing preferences with respect to modifications to an audio performance.

One object of the methodology described below is to provide ways of identifying configuration factors that can compensate segments of an audio performance that have been negatively affected, altered or changed by the loss of signal (signal degradation).

Accordingly, one aspect of an audio broadcast processing method includes a plurality of steps. One step involves processing an audio broadcast having at least one occurrence of signal degradation that adversely affects audio quality of a corresponding segment of the audio performance. Another step involves modifying the segment of the audio performance with a plurality of differing signal degradation compensation factors to selectively compensate for the at least one occurrence of signal degradation to produce a plurality of compensated audio performances. Another step involves evaluating the compensated audio performances. Still another step involves determining at least one preferred signal degradation compensation factor based on data from the evaluating of the compensated audio performances. Yet another step includes configuring an audio device with the at least one preferred processing factor.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
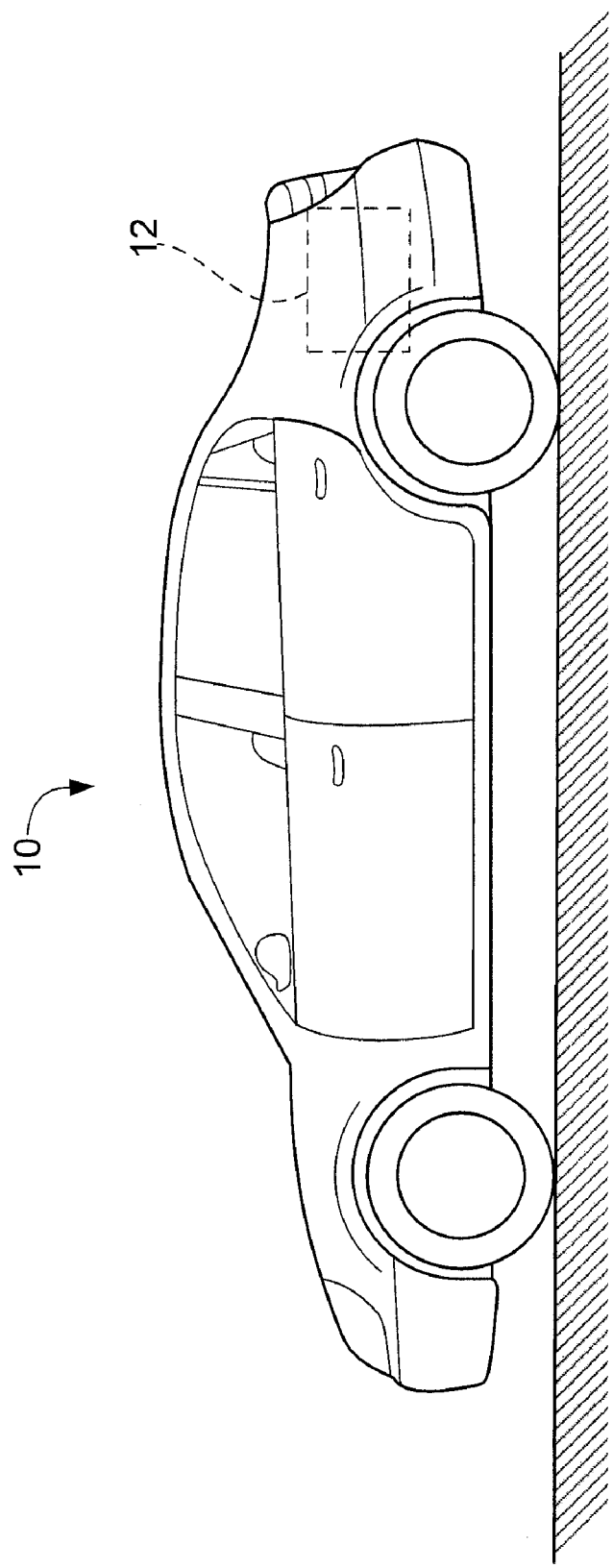
FIG. 1 is a side elevational view of a vehicle that includes an audio broadcast collecting system in accordance with a first embodiment.

Referring initially to FIG. 1, a vehicle 10 is illustrated that includes an audio broadcast collecting system 12, in accordance with a first embodiment.

The vehicle 10 is depicted as a four door passenger vehicle, but can alternatively be any vehicle, such as an SUV, pick-up truck, luxury sedan or economy class vehicle. In other words, the present invention is not limited to any specific type of vehicle, but can be used in or with any vehicle that can be driven on or off road. Further, in at least one embodiment, the vehicle 10 can be omitted and the audio broadcast collecting system 12 can be a stand alone unit, as described in greater detail below.

In the depicted embodiment, the audio broadcast collecting system 12 can be installed anywhere convenient within and or on the vehicle 10. In the depicted embodiment of FIG. 1, the audio broadcast collecting system 12 is shown as being at least partially disposed within a trunk or storage compartment of the vehicle 10. However, it should be understood from the drawings and the description herein that all or a portion of the audio broadcast collecting system 12 can also be located within the passenger compartment of the vehicle 10. In other words, the location of the audio broadcast collecting system 12 within the vehicle 10 is a matter of convenience and is not limited to any one area within or on the vehicle 10.

The following terms are used throughout the following description and are defined below for clarity.

The term broadcast signal refers to any of a variety of modulated electromagnetic signals at any of a variety of frequencies that encode or carry an audio broadcast. The following are examples of broadcast signals: analog radio signals, including AM and FM radio broadcast signals; digital radio broadcast signals including high definition radio broadcast signals; and satellite broadcast signals, including encoded broadcast signals.

The term audio broadcast refers to the information carried by a broadcast signal that can subsequently be electronically processed to produce an audio performance.

The term audio performance as used herein refers to the audible result of an audio broadcast, where the audio performance is extracted from a broadcast signal and played through an audio system (or amplification system) with speakers. In other words, the term audio performance refers to the various sounds a listener hears from an audio system as a result of receiving a broadcast signal, extracting the audio broadcast from the broadcast signal and amplifying the resulting sounds for listening pleasure.

The term audio system is broadly defined herein. There are many types of audio systems. For example, a basic audio system is one that receives an audio broadcast from a separate tuner or signal processor and similarly receives a recording from a separate recording device. Such a basic audio system reproduces the audio broadcast or recording by passing the audio broadcast or recording through an amplifier and speakers to produce an audio performance for a listener's appreciation. Other types of audio systems can include an internal tuner or signal processor that receives broadcast signals and extracts an audio broadcast from one of the broadcast signals. Further, another audio system can include circuitry that modifies and/or enhances an audio performance. The present invention includes use of all of these types of audio systems, as described in greater detail below.

As is described in greater detail below, the audio broadcast collecting system 12 is configured to receive a broadcast signal and extract an audio broadcast therefrom. The audio broadcast collecting system 12 is also configured to make a plurality of recordings of at least one audio performance produced from one audio broadcast, in order to generate recorded samples. These recorded samples are later evaluated and/or analyzed for any of a variety of purposes, as described in greater detail below. For example, a collection of recorded samples of the audio broadcast can be evaluated and/or analyzed for the following reasons: to study audio segments of the recorded samples with diminished quality due to signal degradation; to collect information regarding modified or compensated segments of the recorded samples, where those segments have been modified or compensated to diminish or eliminate the effects of broadcast signal degradation; and/or to test the output of one or more audio systems. In other words, the audio broadcast collecting system 12 of the present invention serves a variety of purposes.

Figure 2:
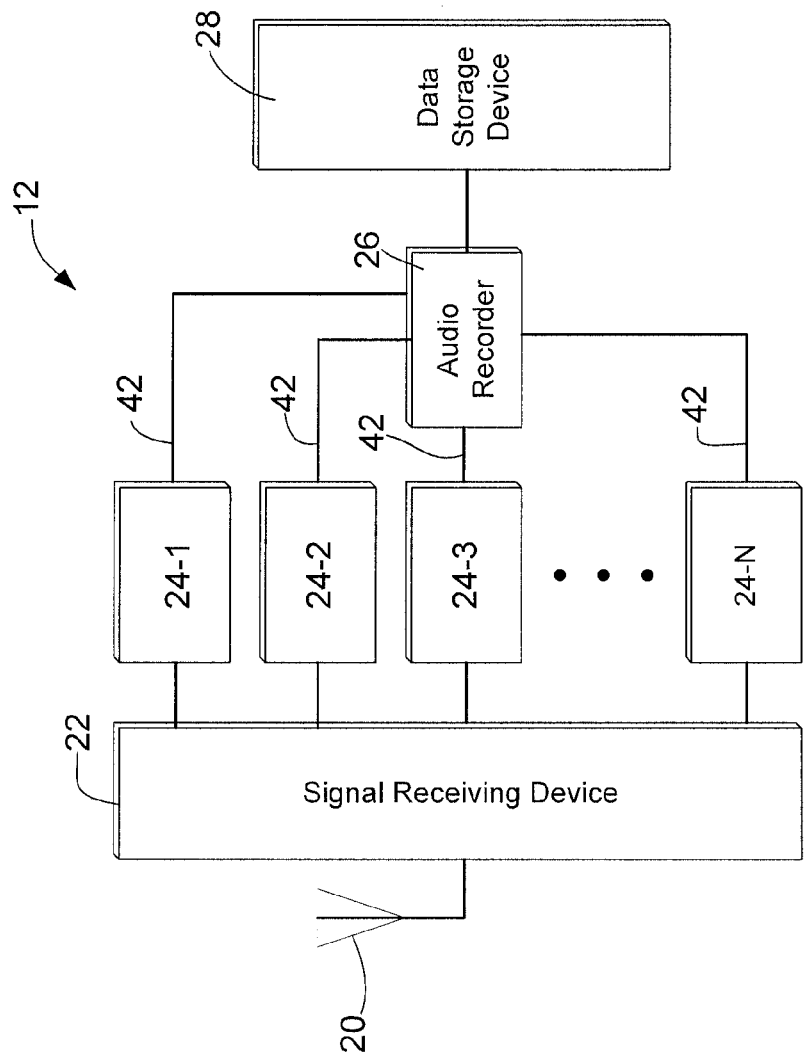
FIG. 2 is a schematic view of the audio broadcast collecting system shown removed from the vehicle, having a signal receiving device, a plurality of audio systems, an audio recorder and a data storage device in accordance with the first embodiment.
Figure 2:
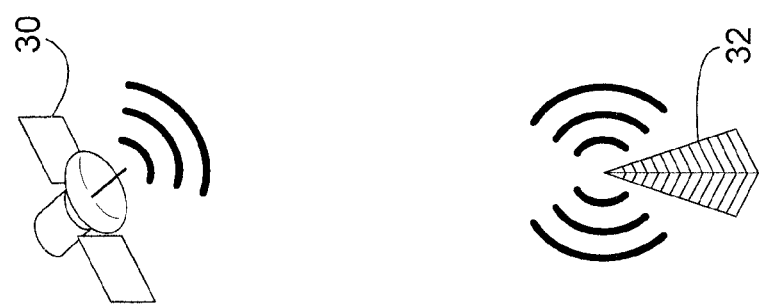

A brief description of one embodiment of the audio broadcast collecting system 12 is now provided. As shown in FIG. 2, the audio broadcast collecting system 12 includes an antenna 20, a signal receiving device 22, a plurality of audio systems 24-1 thru 24-N, an audio recorder 26 and a data storage device 28.

The antenna 20 can be any of a variety of signal receiving antennas that can receive transmissions from a satellite 30, a RF source (radio frequency source) 32 or both. The signals received from the satellite 30 and/or the RF source can be analog, digital or both.

The signal receiving device 22 can be a conventional tuner or signal processor that receives broadcast signals. The signal receiving device 22 can also include a signal splitter (not shown) that splits broadcast signals and provides the broadcast signals to each of the plurality of audio systems 24-1 thru 24-N. The signal splitter can also provide gain to the split signal to ensure uniform delivery of the signal to each of the audio systems 24-1 thru 24-N.

The plurality of audio systems 24-1 thru 24-N are operably coupled for movement with the vehicle 10. Each audio system 24 of the plurality of audio systems 24-1 thru 24-N is configured to receive the same audio broadcasts from the signal receiving device 22 during the audio collecting process, as described in greater detail below.

Figure 3:
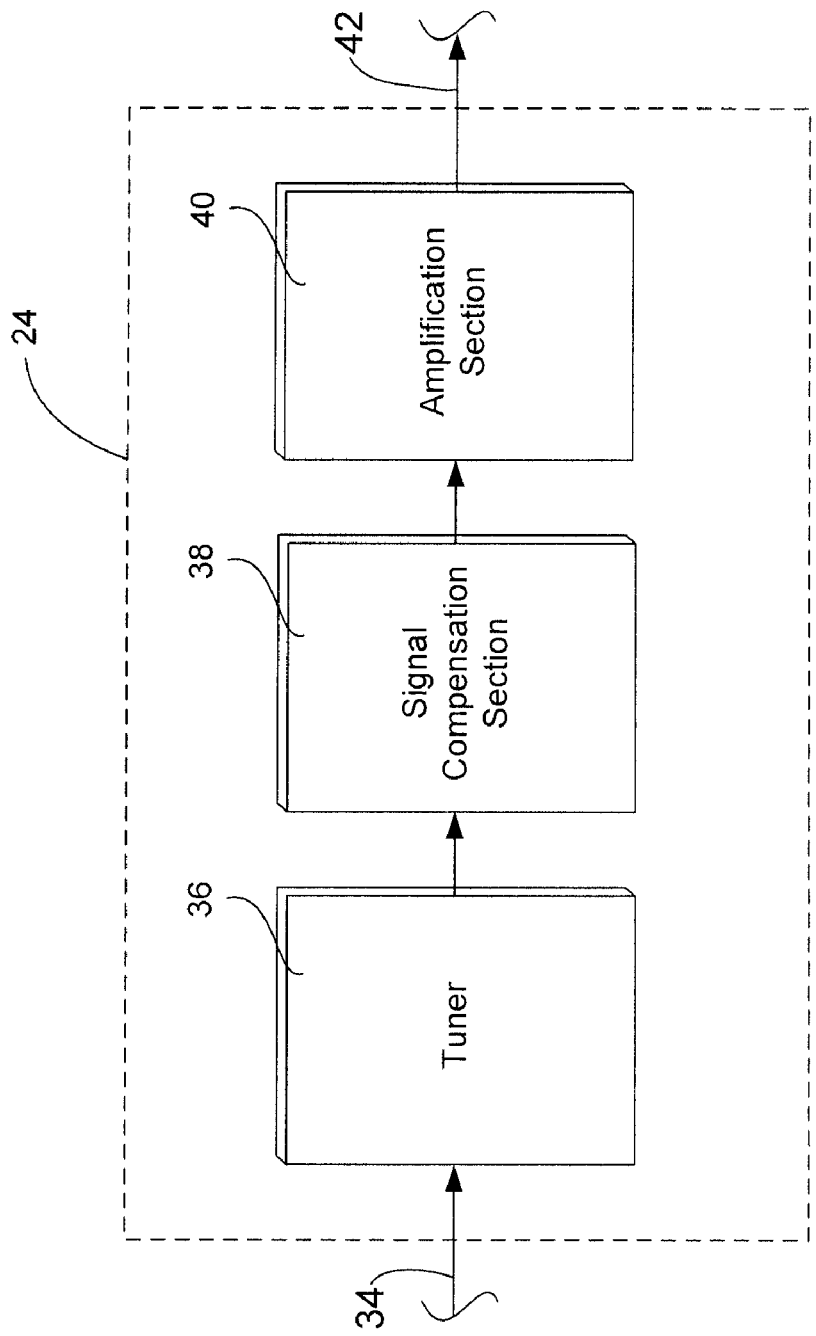
FIG. 3 is a schematic block diagram showing features one of the audio systems of the plurality of audio systems, the audio system having a tuner, an optional signal compensation section and an amplification section in accordance with the first embodiment.

As shown in FIG. 3, each audio system 24 of the plurality of audio systems 24-1 thru 24-N includes an input 34, a tuner 36, an optional signal compensation section 38, an amplification section 40 and an output 42. The input 34 of each audio system 24-1 thru 24-N is preferably connected to the signal receiving device 22. The input 34 is further connected to the tuner 36 in a conventional manner. The tuner 36 can be any of a variety or combination of conventional tuners that receives broadcast signals that carry or encode audio broadcasts from any of a variety of differing types of signal sources, such as AM signals, FM signals and satellite signals. In other words, the tuner 36 can be any conventional tuner capable of receiving broadcast signals, can be tuned to a specific frequency in order to receive just one broadcast signal, and output the audio broadcast from that broadcast signal. The audio broadcast is subsequently processed by the optional signal compensation section 38 and the amplification section 40 to produce an audible audio performance.

The signal compensation section 38 is a signal processing unit that processes the received audio broadcasts. The signal compensation section 38 is optional and can be omitted in certain applications of the methodology described herein. When included, the signal compensation section 38 is configured to modify segments of the audio broadcast that correspond to degradation of the received broadcast signal (signal degradation). Specifically, the audio performance corresponding to the received audio broadcast can include segments of audio that have reduced quality due to degradation of the broadcast signal. The signal compensation section 38 can be configured to modify and/or compensate those segments of the audio broadcast that suffer from signal degradation, as is described in greater detail below.

Each signal compensation section 38 includes a variety of audio manipulation factors or configuration factors that are provided to compensate for signal degradation that affects the quality of the corresponding audio performance. Specifically, when a segment of an audio broadcast received by the signal receiving device 22 demonstrates signal degradation, the signal compensation section 38 temporarily modifies the segment of the audio broadcast to compensate for reduced audio quality of that segment such that the effects of the signal degradation are reduced or eliminated in the subsequent audio performance, as is described in greater detail below.

Further, the tuner 36 and/or the signal compensation section 38 can be provided with a signal degradation detecting unit (not shown) that detects signal degradation in the audio broadcast. In response to detection of signal degradation, the signal compensation section 38 is configured to modify only those segments of the audio broadcast corresponding to the signal degradation to compensate for the signal degradation, as is described in greater detail below.

The amplification section 40 is preferably a conventional amplification section that provides EQ (audio equalization) and volume control for the audio performance. The amplification section 40 then provides the audio broadcast to the output 42, which in turn causes the conventional speakers to produce the audio performance for a person's listening pleasure and/or to the audio recorder 26, as described below.

The audio recorder 26 can be a single audio recording device as depicted in FIG. 2. More specifically, the audio recorder 26 includes a single recording device configured to record all of the samples of the audio performances from each of the plurality of audio systems 24-1 thru 24-N simultaneously. The audio recorder 26 is preferably a digital recording device with sampling rates that provide the recorded samples with accurate reproductive capability. The audio recorder 26 is connected to the data storage device 28, which stores the recorded samples of the audio performances, as shown in FIG. 2. Consequently, the audio recorder 26 is operatively coupled to each audio system 24 of the plurality of audio systems 24-1 thru 24-N.

Figure 4:
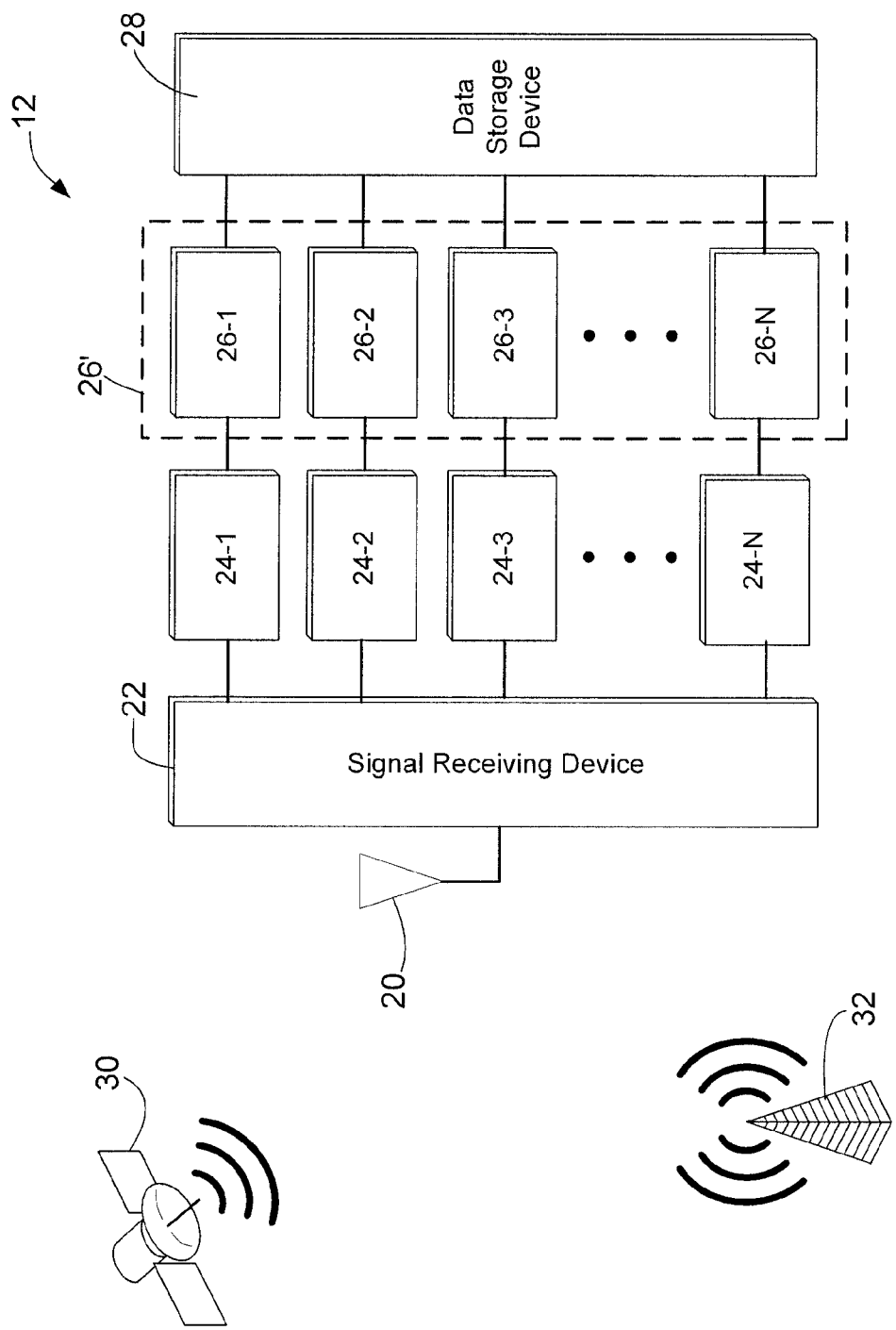
FIG. 4 is a schematic view of another audio broadcast collecting system similar to the audio broadcast collecting system depicted in FIG. 2, the audio broadcast collecting system having a plurality of audio recorders in accordance with the first embodiment.

Alternatively, the audio recorder 26 can be replaced with an audio recorder 26' that includes a plurality of separate audio recording units 26-1 thru 26-N, such that there is a one-to-one correspondence between the audio systems 24-1 thru 24-N and the audio recording units 26-1 thru 26-N, as indicated in FIG. 4. This alternative configuration can be used in applications where very high quality recorded samples are required.

The data storage device 28 is a removable device that is removed from the audio broadcast collecting system 12 (and the vehicle 10), such that the evaluating of the recorded samples can be conducted in a controlled environment, away from the vehicle 10 and the driving route 50. The data storage device 28 can be, for example, a computer hard drive, or USB memory unit with sufficient storage space to store the plurality of recorded samples.

Figure 5:
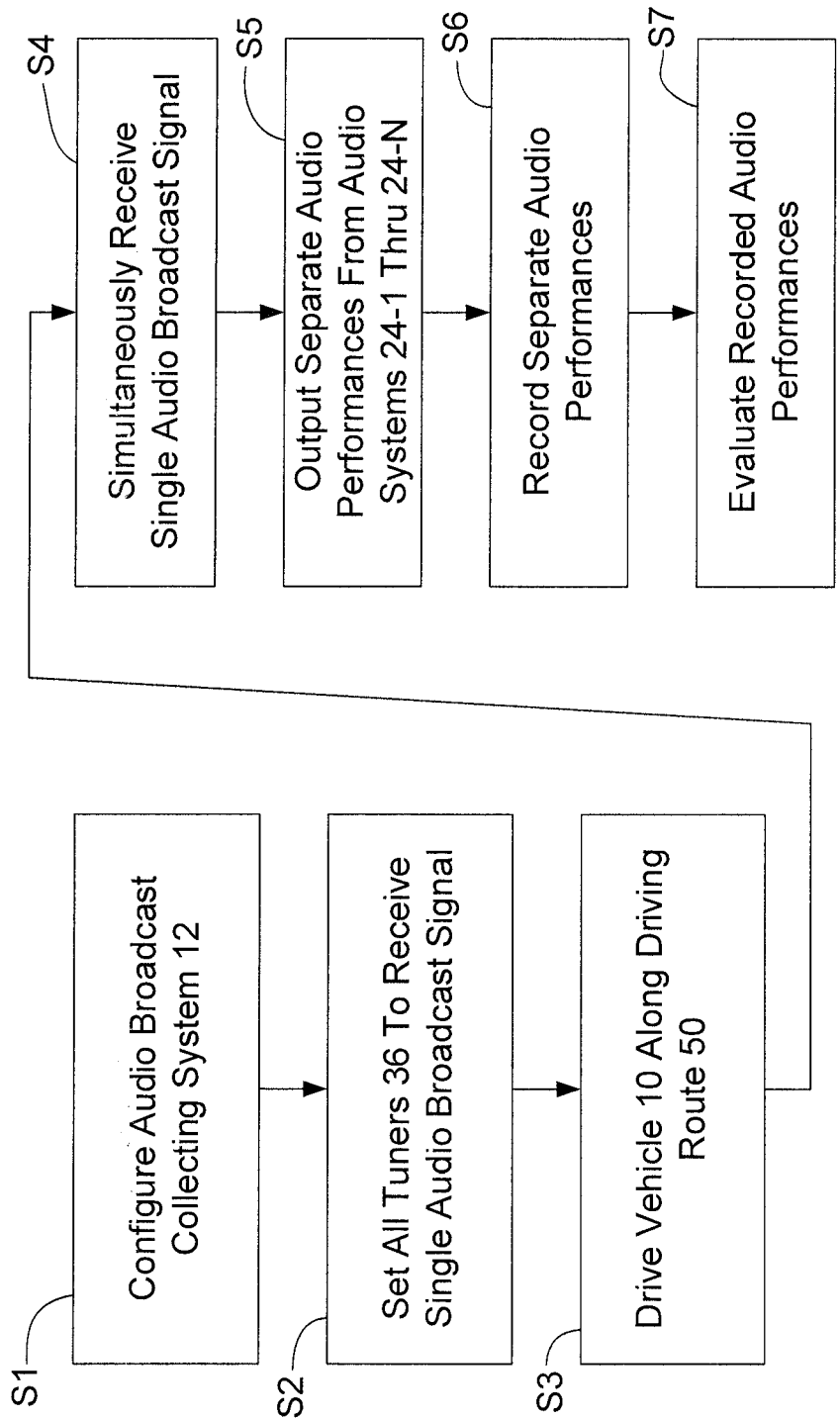
FIG. 5 is a flowchart showing basic steps of an audio broadcast collecting method using either of the audio broadcast collecting systems depicted in FIGS. 2 and 4 in accordance with the first embodiment.

A description of a method of using the audio broadcast collecting system 12 in accordance with a first embodiment is now provided with specific reference to the flowchart in FIG. 5.

As shown in FIG. 5, a first step Si includes installing and/or configuring the audio broadcast collecting system 12 to operate in or on the vehicle 10. At second step S2, all the tuners 36 are adjusted to receive a single audio broadcast signal. In other words, all of the tuners 36 receive the same audio broadcast signal and provide the same audio performance to the optional signal compensation section 38 and/or the amplification section 40.

Figure 6:
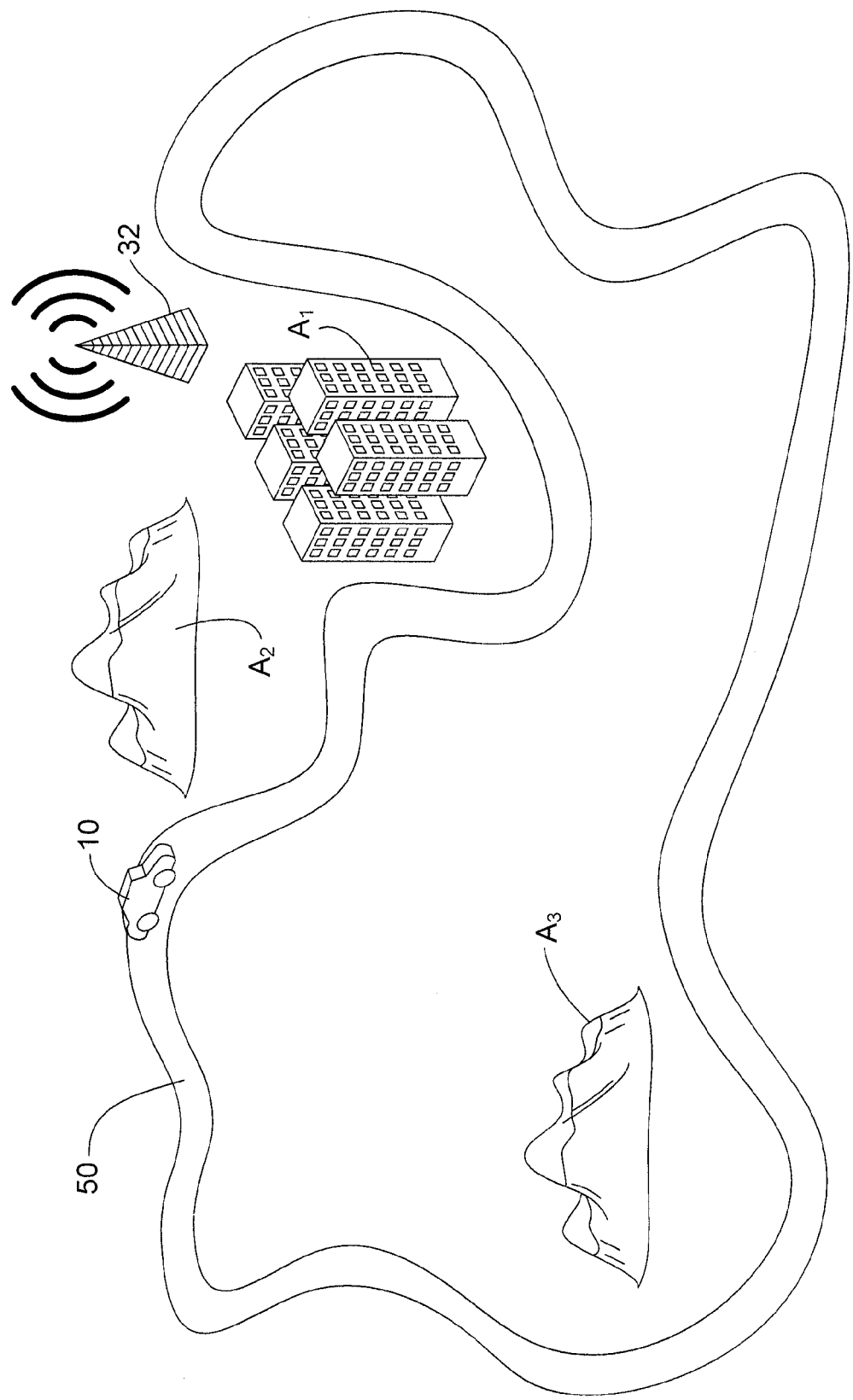
FIG. 6 is a schematic view of a driving route indicating the vehicle traversing the driving route, the driving route having a plurality of natural obstacles that can interfere with broadcast signal reception leading to signal degradation in accordance with the first embodiment.

At step S3, the vehicle is driven through or around a driving route 50 or test course, shown in FIG. 6. The driving route can be a random course or can be a pre-determined course planned out in advance. The driving route 50 can be any of a variety of driving courses. For example, the driving route 50 can be a test course specifically designed and built for testing vehicles. Alternatively, the driving route 50 can be a prearranged driving route through and/or around, for example, a large city such as Los Angeles or other urban environment, or a drive through a mountainous region.

Regardless of the location of the driving route 50, the driving route 50 includes broadcast signal interfering obstacles. The obstacles can be man-made or natural. For example, the obstacles can include tall buildings $A_1$, hills $A_2$, mountains $A_3$ and/or other geological formations such as rock outcroppings or mineral deposits that might interfere with broadcast signal reception. One reason for including such obstacles along the driving route is to encourage signal degradation in the reception of a broadcast signal along at least one portion of the driving route 50. These signal degradations can cause corresponding quality disruptions in the audio performances outputted from the audio systems 24-1 thru 24-N. One objective of the methodology is to evaluate the response from audio systems 24-1 thru 24-N when experiencing broadcast signal degradation. Hence, the driving route 50 is a predetermined course that includes obstacles that interfere with reception of the broadcast signal and corresponding audio broadcast.

Steps S4, S5 and S6, described below, preferably occur simultaneously while the vehicle 10 is being driven along the driving route 50.

At step S4, the single audio broadcast signal is received by each of the tuners 36 of the audio systems 24-1 thru 24-N. At Step S5, each of the plurality of audio systems 24-1 thru 24-N outputs a separate audio performance. At step S6, the audio recorder 26 records each of the separate audio performances outputted from the plurality of audio systems 24-1 thru 24-N. More specifically, the audio recorder 26 records an audio sample from each of the separate audio performances outputted by the plurality of audio systems 24-1 thru 24-N simultaneously to obtain recorded samples. The audio recorder 26 then stores the recorded samples in the data storage device 28.

The recorded samples are obtained while traversing around the driving route 50. The recorded samples are then stored in the data storage device 28. Each recorded sample includes a segment of the audio performances that experienced quality disruptions caused by corresponding signal degradation. These segments are evaluated at a later time and/or date, as described in greater detail below.

As indicated at step S7, the recorded samples of the audio performances can be evaluated afterword using any of a variety of criteria, as described in greater detail below.

As mentioned above, the steps in the flowchart of FIG. 5 can be used for any of a variety of experiments and testing operations. For example, the evaluating the recorded samples can be conducted by comparing one recorded sample with another recorded sample. In other words, the recorded samples can be evaluated with respect to each other. The evaluating of the recorded samples includes playing back the recorded samples to at least one evaluator. The evaluator can be one listener or a group of listeners, as is described in greater detail below.

The methodology represented in FIG. 5 can be for the purpose of testing a group of identical audio systems 24-1 thru 24-N. Specifically, when all of the plurality of audio systems 24-1 thru 24-N are identical, the methodology described above can be used to evaluate quality of each of the audio systems 24-1 thru 24-N. In other words, by subjecting all of the audio systems 24-1 thru 24-N to identical audio broadcasting receiving conditions and identical signal degradation compensation factors, the audio performances can be compared to one another to determine whether or not each of the audio systems 24-1 thru 24-N is performing to desired output specifications. More specifically, the methodology represented in FIG. 5 can be used for quality control purposes.

When the plurality audio systems 24-1 thru 24-N are each a differing audio system (none being identical), the methodology described above can be used to evaluate and compare the quality of each of the differing audio systems. In other words, by subjecting all of the audio systems 24-1 thru 24-N (with each of the audio systems being different from one another) to identical broadcasting signal receiving conditions, the corresponding audio performances can be compared to one another to determine which audio system or systems has the most desirable, advantageous and/or appreciated outputted audio performance.

Further, in a test or experiment where all of the plurality of audio systems 24-1 thru 24-N are identical, but are provided with the optional signal compensation sections 38, where each signal compensation section 38 is provided with a differing set of compensation factors (described below), the methodology described above is used to evaluate advantages and disadvantages of each of the differing sets of compensation factors. In other words, by subjecting all of the audio systems 24-1 thru 24-N (identical to one another, but each with differing compensation factors) to identical broadcast signal receiving conditions, the audio performances can be compared to one another to determine which set or sets of compensation factors provide a more pleasing audio performance.

Hence, the evaluating of the recorded samples can include identification of at least one signal degradation compensation factor to adequately compensate for occurrences of signal degradation. Further, in order to facilitate the identification of signal degradation compensation factors, the outputting from each of the plurality of audio systems includes configuring each of the signal compensation sections 38 of the plurality of audio systems 24-1 thru 24-N with a differing signal degradation compensation factor or a differing set of signal degradation compensation factors. A description of the compensation factors is provided below in the second embodiment.

It should be understood from the drawings and the description herein that it is not necessary for the audio broadcast collecting system 12 to be installed within a vehicle. More specifically, the audio broadcast collecting system 12 can be assembled in a laboratory with driving conditions and broadcast signal receiving interfering obstacles being simulated. For example, in an alternative configuration, the audio broadcast collecting system 12 can be installed in a stationary vehicle or in a laboratory without a vehicle. In such a configuration, man made obstacles can be introduced to simulate natural obstacles. More specifically, signal degradation can be simulated in order to test audio systems without the need to drive a vehicle or vehicles around the driving route 50. Further, the vehicle 10 can be driven to specific locations along the driving course, and left stationary when those specific locations are known to experience signal interference or have varying interference. As well, differing conditions can be employed for reception of AM radio signals and FM signals. For example, stationary testing can provide more informative results when the receiving AM signals.

Figure 7:
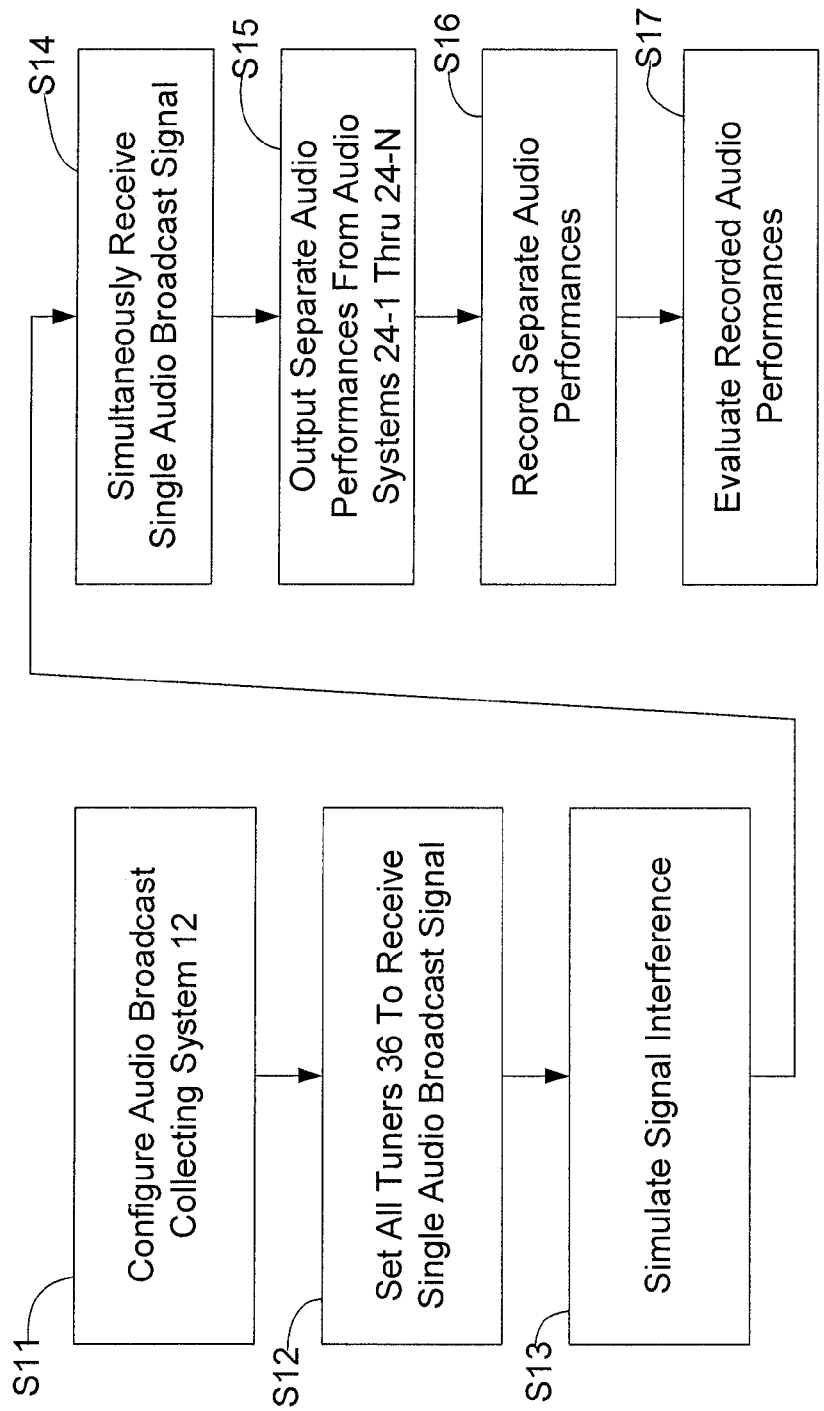
FIG. 7 is another flowchart showing modifications to the basic steps of the audio broadcast collecting method depicted in FIG. 5, using either of the audio broadcast collecting systems depicted in FIGS. 2 and 4 in accordance with the first embodiment.

FIG. 7 shows a flowchart with operational steps for conducting tests and/or experiments where the audio broadcast collecting system 12 is stationary. At a first step S11, the audio broadcast collecting system 12 is set up in a stationary vehicle 10 or in a laboratory. Basically, a vehicle that moves is not needed in this configuration because the audio broadcast collecting system 12 is stationary. At second step S12, all the tuners 36 are adjusted to receive a single broadcast signal. In other words, all of the tuners 36 receive the same broadcast signal.

It should be understood from the drawings and the description herein, that when the audio broadcast collecting system 12 is stationary (in a laboratory) the broadcast signals can be simulated. For example, the laboratory can be provided with its own transmitter.

At step S13, a driving route is simulated. Specifically, artificially created or generated broadcast signal interfering obstacles are generated that selectively interfere with broadcast signals. Such obstacles can be created by, for example: moving sheets of material, such as steel, between the transmitter (the satellite 30 and/or the RF source 32) and the antenna 20 of the audio broadcast collecting system 12; generating electromagnetic interference; and/or other obstacles that induce temporary, selectively intermittent signal degradation.

At step S14, the single audio broadcast signal is received by each of the tuners 36. At Step S15, each of the plurality of audio systems 24-1 thru 24-N outputs a separate audio performance. At step S16, the audio recorder 26 records each of the separate audio performances outputted from the plurality of audio systems 24-1 thru 24-N. More specifically, the audio recorder 26 records a separate audio sample from each of the separate audio performances outputted by the plurality of audio systems 24-1 thru 24-N simultaneously to obtain a corresponding plurality of recorded samples. The audio recorder 26 then stores the recorded samples in the data storage device 28. Hence, the simultaneously receiving of a single audio broadcast by the plurality of audio systems 24-1 thru 24-N is performed with simulations of signal degradation of the single audio broadcast and with the audio broadcast collecting system 12 being stationary.

The recorded samples stored in the data storage device 28 include segments of the audio performances that experienced quality disruptions caused by corresponding signal degradation.

As indicated at step S17, the recorded samples of the audio performances can be evaluated afterword using any of a variety of criteria, such as consistency between recorded samples, overall quality of the recorded samples, and in experiments where the signal compensation section 38 is employed, the effectiveness of compensation factors on segments of the recorded samples having reduced quality due to signal degradation.

The evaluating of the recorded samples can be conducted in any of a variety of ways. For example, the evaluating of the recorded samples includes comparing at least one of the recorded samples from a first audio system of the plurality of audio systems 24-1 thru 24-N with another recorded sample from a similarly configured second audio system of the plurality of audio systems 24-1 thru 24-N.

Regardless of the method used to collect the recorded samples, the recorded samples can be evaluated outside of the vehicle 10. For example, as shown in FIG. 8, a playback apparatus 60 is provided for playing back the recorded samples and evaluating the recorded samples of the audio performances.

Figure 8:
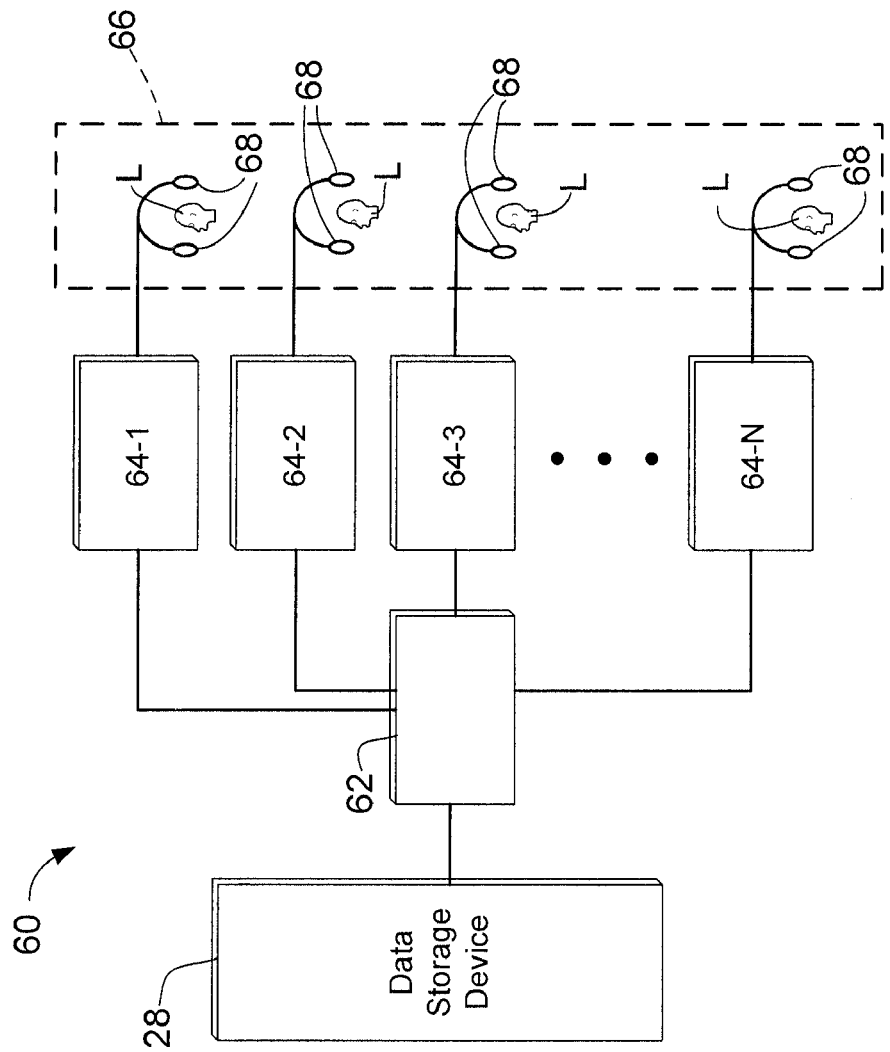
FIG. 8 is a schematic view of a playback system that uses recorded samples stored in the data storage device and includes an audio delivery device, a plurality of audio systems and a panel of evaluators who provide feedback on audio performances of the recorded samples in accordance with the first embodiment.

As shown in FIG. 8, the playback apparatus 60 includes the data storage device 28, an audio delivery device 62, a plurality of audio systems 64-1 thru 64-N and a panel of evaluators 66. The data storage device 28 is removable from the audio broadcast collecting system 12 and insertable into the playback apparatus 60. The data storage device 28 is connected to the audio delivery device 62 such that the recorded samples are transmitted to the audio delivery device 62. The audio delivery device 62 can be a computer or similar signal processing device that retrieves the recorded samples from the data storage device 28 and delivers the recorded samples one-by-one to the plurality of audio systems 64-1 thru 64-N.

The plurality of audio systems 64-1 thru 64-N are preferably basic audio systems and only include an amplification section and a set of speakers 68. The speakers 68 can be conventional stereo playback speakers or conventional headphones. The speakers 68 are provided such that each listener of the panel of evaluators 66 can listen to the recorded samples and evaluate their content (for example, the quality of the recorded samples).

The plurality of audio systems 64-1 thru 64-N are preferably all identical such that each listener L of the panel of evaluators 66 has the same capability of sound quality provided to them.

The audio systems 64-1 thru 64-N are provided such that listeners L of the panel of evaluators 66 can listen to the recorded samples and provide verbal feedback, written feedback and/or press buttons on evaluation computer screens to indicate their opinion of the quality of each recorded sample played for them.

For example, each listener L of the panel of evaluators 66 can listen to each of the recorded samples, one by one, to judge the audio quality of each of the audio systems 24-1 thru 24-N.

It should be understood from the description and drawings herein, that for certain tests, the panel of evaluators 66 can be a single listener or evaluator, a group of listeners or evaluators, or can be an audio analyzing device that electronically compares the recorded samples for quality and variations between the recorded samples. The make-up of the panel of evaluators 66 depends upon the equipment being tested and the confines of the tests.

One of the uses of the methodology and/or systems described above, is to evaluate the effects of signal degradation on an audio performance. More specifically, the methodology can be used to find desirable compensation factors that modify segments of an audio performance that have reduced quality due to signal degradation. The second embodiment described below focuses on finding solutions to the effects of signal degradation on audio performances.

Second Embodiment

Figure 9:
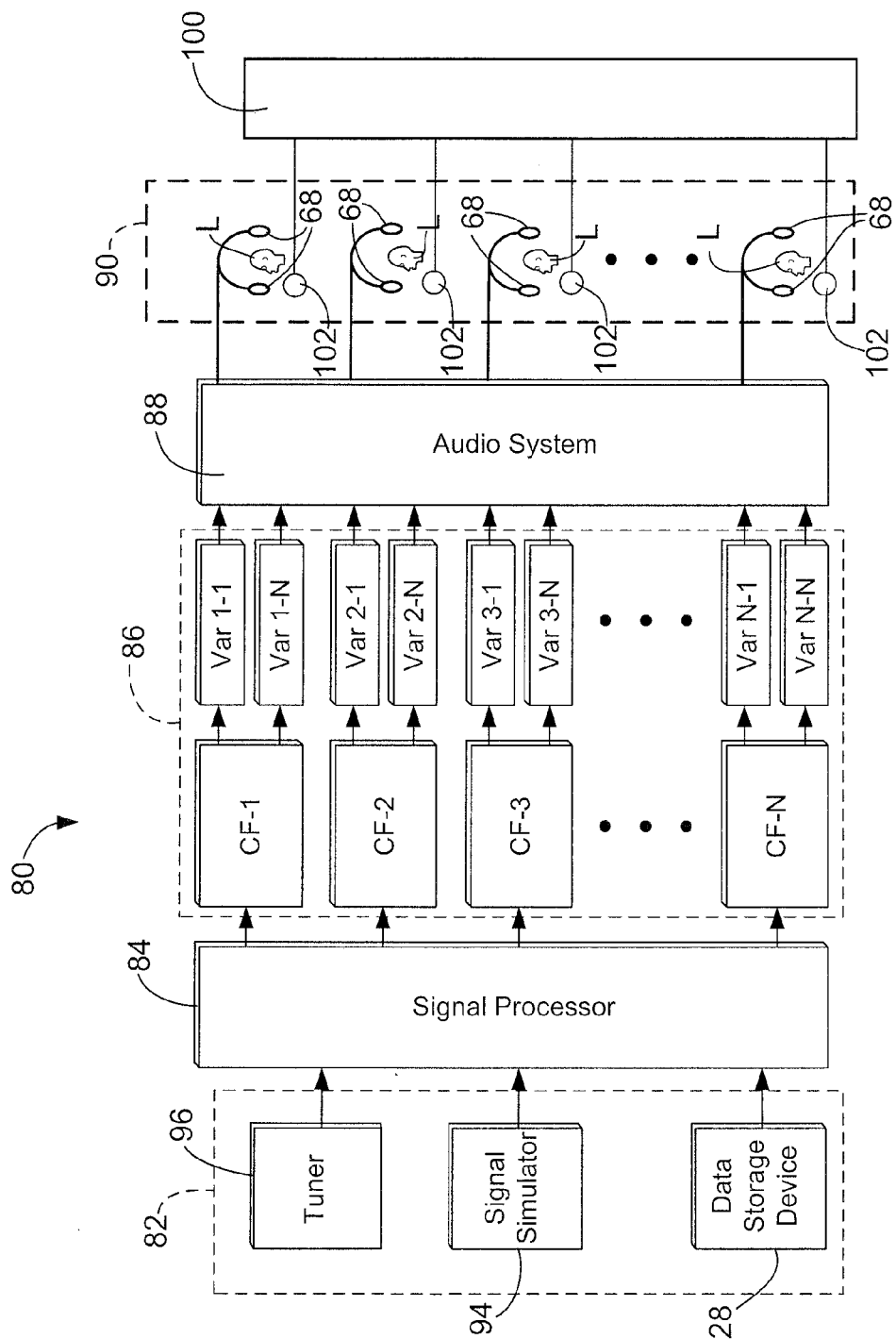
FIG. 9 is a schematic block diagram of an audio broadcast processing system showing a signal compensation section that is programmable or configurable to implement a plurality of differing signal degradation compensation factors such that subsequent audio performances included segments that have been compensated to reduce the effects of signal degradation in accordance with a second embodiment.
Figure 10:
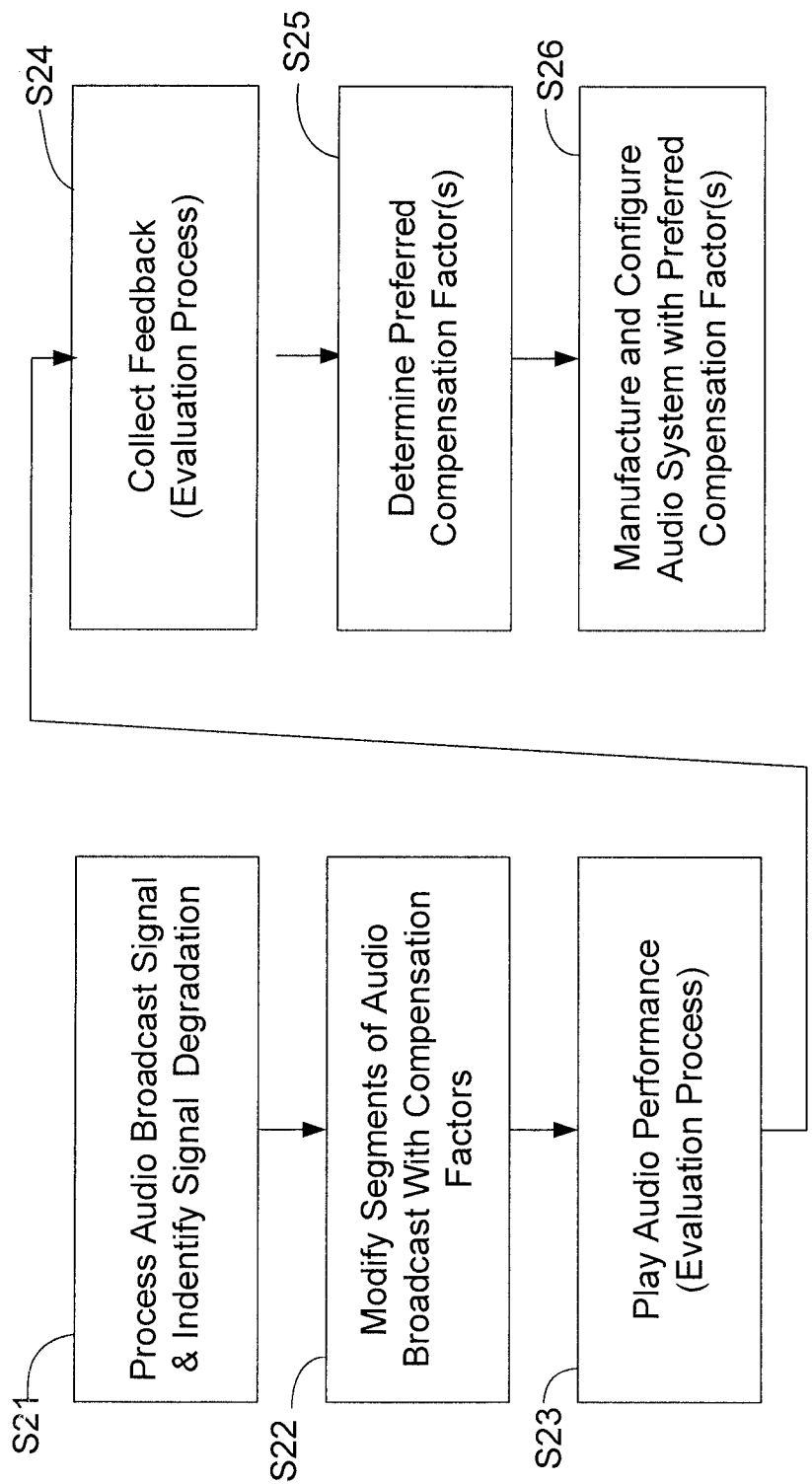
FIG. 10 is a flowchart showing various steps of an audio broadcast processing method where a panel of evaluators provide feedback in order to identify preferred signal degradation compensation factors that compensate segments of audio that have been adversely affected as a result of signal degradation in accordance with the second embodiment.
Figure 11:
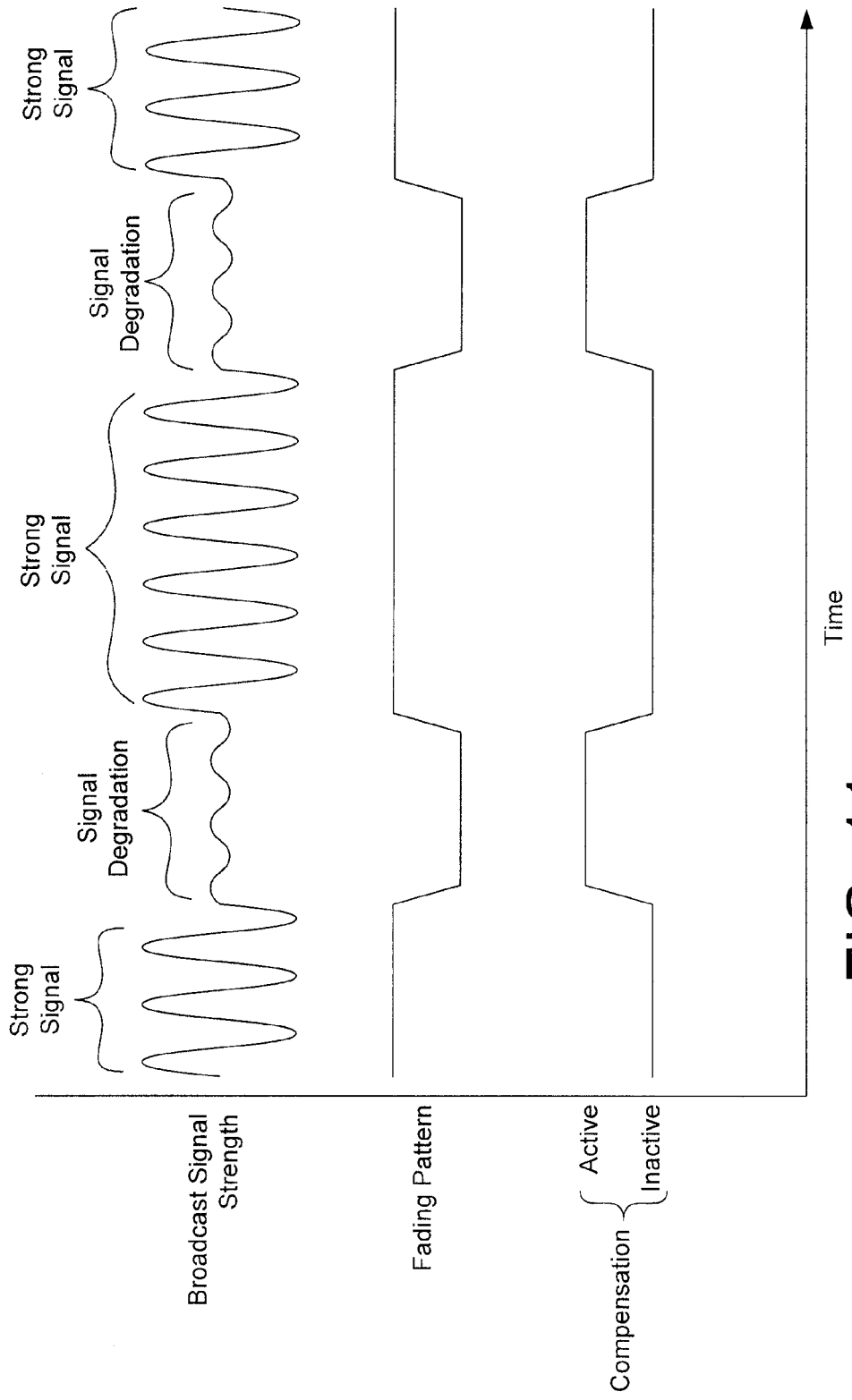
FIG. 11 is a graph showing a schematic view showing a broadcast signal received by a tuner having segments with a strong signal and segments with signal degradation, and a fading pattern generated to identify those segments of the broadcast signal that correspond to signal degradation in accordance with the second embodiment.

Referring now to FIGS. 9-11, an audio broadcast processing system 80 in accordance with a second embodiment will now be explained. Since the subject matter of the first and second embodiments is closely related, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The audio broadcast processing system 80 is shown in FIG. 9 and corresponding implicit methodology is depicted in FIG. 10. The audio broadcast processing system 80 and the methodology described below provide an arrangement where a panel of evaluators (listeners L) listens to an audio performance. Segments of the audio performance that have altered or diminished quality due to signal degradation of the broadcast signal and corresponding audio broadcast are compensated using compensation factors selected and/or arranged to compensate the affected segments of the audio broadcast signal. A panel of evaluators provides feedback on the compensation factors. The feedback is then further evaluated to determine which compensation factor or factors suit a given group of listeners, as is described in greater detail below.

FIG. 11 is a chart that shows a schematic rendering of a broadcast signal received by a moving vehicle, such as the vehicle 10 shown in FIGS. 1 and 6. As the vehicle 10 traverses the driving route 50 in FIG. 6, there are times when the vehicle 10 receives a strong broadcast signal and times when an obstacle interferes with broadcast signal reception by the vehicle 10. Hence, the corresponding segment of the audio broadcast experiences the effects of signal degradation. Specifically, when the vehicle 10 has a clear line-of-sight with respect to the RF source 32, the signal strength is typically good and strong. The resulting broadcast performance by an audio system within the vehicle 10 is likewise good. However, when an obstacle, such as the tall buildings $A_1$, the hills $A_2$ and/or the mountains $A_3$ is located between the vehicle 10 and the RF source 32, the signal quality can suffer. Similarly, the audio performance can have reduced quality in corresponding segments of the audio performance. In other words, the obstacles can cause signal degradation.

The schematic representation of the broadcast signal depicted in FIG. 11 shows segments of the broadcast signal that are strong and segments that are weakened or disrupted resulting in signal degradation. One usage for aspects of the methodology described herein is to identify compensation factors that compensate segments of the audio performance that have altered or diminished quality due to signal degradation of the broadcast signal.

As shown in FIG. 9, the audio broadcast processing system 80 basically includes an audio broadcast source 82, a signal processor 84, a programmable signal compensation section 86, an amplification system 88 and a panel of evaluators 90.

The audio broadcast source 82 can be selected from any of a plurality of audio broadcast sources. For example, the audio broadcast source 82 can be an audio performance recorded to the data storage device 28 using the audio broadcast collecting system 12 and/or the methodology depicted in FIG. 5 or 7 can be used in the audio broadcast processing system 80. Alternatively, the audio broadcast source 82 can be a private or simulated broadcast signal generator 94 that transmits a private broadcast signal that includes an audio broadcast that can be processed into an audio performance. In another alternative, the audio broadcast source 82 can be a live broadcast signal captured by a tuner 96. Regardless, the audio broadcast is fed to a signal processor 84 shown in FIG. 9.

The signal processor 84 takes the broadcast signal and extracts an audio broadcast from it. The signal processor 84 also includes a signal degradation detecting unit (not shown) that detects signal degradation in the audio broadcast. Further, the signal processor 84 is configured to generate signals that define a fading pattern depicted schematically in FIG. 11. Specifically, the fading pattern is a signal that indicates detected segments of signal degradation of the broadcast signal and corresponding audio broadcast. As shown in FIG. 11, the fading pattern includes depressions that correspond directly with the segments of the broadcast signal with signal degradation. The fading pattern is transmitted in real time to the signal compensation section 86.

The signal compensation section 86 is a programmable unit that serves as a testing mechanism to test differing ways to augment, filter, enhance and/or modify those segments of the audio broadcast that correspond to the signal degradation identified by the signal processor 84. More specifically, the signal compensation section 86 is made active during segments of the audio broadcast corresponding to signal degradation and made inactive during the remainder of the audio broadcast. The signal compensation section 86 is made active and inactive in response to the fading pattern signals provided by the signal processor 84.

The signal compensation section 86 is programmable and/or configurable in the following manner. As indicated in FIG. 9, the signal compensation section 86 can include a plurality of configuration factors CF-1 thru CF-N. Each configuration factor CF of the configuration factors CF-1 thru CF-N includes at least one, and possibly a plurality of variable components. For example, configuration factor CF-1 includes variable components Var 1-1 thru Var 1-N, configuration factor CF-2 includes variable components Var 2-1 thru Var 2-N and so on.

Each variable component alters a specific audible feature and/or group of audible features of an audio broadcast. For example, the variable components include but are not limited to features such as: a high-cut with attack and release timing; a high-cut with gain attenuation; a stereo-blend with attack and release timing; a stereo-blend with gain attenuation; a soft mute with attack and release timing; and a soft mute with gain attenuation. The variable components can further include click noise filters, notch filters, and various types of audio filters too numerous to mention. In other words, the configuration factors can include any of a variety of variable components that can alter, enhance, modify and/or filter segments of an audio performance in order to provide compensation to the segment of the audio broadcast that exhibits reduced audible qualities as a result of signal degradation. Hence, when the audio performance is produced via the speakers 68 of the audio system 88, the effects of signal degradation have been reduced and possibly eliminated.

Further, the signal compensation section 86 can be connected to, or be part of a computer system that includes various input and selection screens that enable an operator to construct the plurality of configuration factors CF-1 thru CF-N.

The audio system 88 includes an amplification system that provides the same audible sounds to each listener of the panel of evaluators 90. Specifically, the audio system 88 includes a plurality of speakers 68 that all receive and produce the same audio performance to each listener L of the panel of evaluators 90.

During the audio performance, either the operator or the listeners L in the panel of evaluators 90 can manually cycle through each of the configuration factors CF-1 thru CF-N. Each configuration factor of the plurality of configuration factors CF-1 thru CF-N compensates a segment of the audio broadcast when the fading pattern (FIG. 11) indicates that the segment corresponds to signal degradation. As each of the configuration factors CF-1 thru CF-N is used to compensate a segment of the audio performance, the panel of evaluators provide feedback regarding the effectiveness of each of the configuration factors CF-1 thru CF-N.

Alternatively, the computer system that forms a part of the signal compensation section 86 can automatically change sequentially or randomly between one or more of the configuration factors CF-1 thru CF-N providing the listeners of the panel of evaluators 90 with differing sets of configuration factors in an unpredictable order.

Each of the listeners of the panel of evaluators 90 can provide feedback by writing their comments on paper. Alternatively, as indicated in FIG. 9, the listeners of the panel of evaluators 90 can use a feedback device 100 with input mechanisms 102. The feedback device 100 can be a computer that collects the feedback provided by the panel of evaluators 90. The input mechanisms 102 can be keyboards of a computer, a touch screen of a computer or a handheld feedback device that includes a series of buttons pressed by the listeners L of the panel of evaluators 90 as they determine their preferences. More specifically, as each listener L of the panel of evaluators 90 makes a decision about a particular one of the compensation factors CF-1 thru CF-N, the listener L indicates his or her preference using the input mechanism 102 of the feedback device 100. The feedback compiled by the feedback device 100 is then evaluated in a manner described in greater detail below.

It should be understood from the drawings and the description herein that the panel of evaluators 90 and the panel of evaluators 60 can be the same group of listeners or can be differing groups of listeners. However, the audio broadcast processing system 80 is generally intended for use with groups of individuals who serve as listeners in the panel of evaluators 90. Whereas, when utilizing the audio broadcast collecting system 12 and corresponding methodology of the first embodiment, in certain data collecting applications, the panel of evaluators 60 can be replaced with electronic audio analyzing equipment.

An audio broadcast processing method carried out with, for example, the audio broadcast processing system 80, is now described with specific reference to the flowchart depicted in FIG. 10.

At step S21 in FIG. 10, the signal processor 84 processes one of the outputs from the broadcast source 82 (a recording, a simulated broadcast signal or an actual broadcast signal) and outputs an audio broadcast. The broadcast source 82 thereby provides a broadcast signal that includes at least one occurrence of signal degradation that adversely affects audio quality of a corresponding segment of a corresponding audio performance. The processing of the audio broadcast at step S21 includes providing the audio broadcast with a predetermined fading pattern for a plurality of occurrences of signal degradation. In other words, the signal processor 84 identifies segments of the audio broadcast that may have quality issues due to interference with the reception of the broadcast signal (signal degradation). Along with outputting the audio broadcast, the signal processor 84 also outputs a fading pattern identifying segments of the audio broadcast that may have diminished quality.

At step S22, the signal compensation section 86 modifies the segment or segments of the audio broadcast that have been identified as having audio quality problem(s) in response to the fading pattern outputted from the signal processor 84. Specifically, a plurality of differing signal degradation compensation factors selectively compensate for occurrences of signal degradation. The signal compensation section 86 produces a plurality of compensated audio broadcasts, one compensated audio performance for each compensation factor CF-1 thru CF-N.

The modifying of the segment in step S22 is such that each signal degradation compensation factor includes at least two variable components that compensate for the occurrence of signal degradation. The variable components can include, among others, the audio altering elements listed in Table 1.

TABLE 1

| Variable Component | Affects: |
|---|---|
| High-cut attack timing | Treble Range Frequencies |
| High-cut release timing | Treble Range Frequencies |
| High-cut with gain attenuation | Treble Range Frequencies |
| Stereo-blend attack timing | Stereo speaker balance |
| Stereo-blend release timing | Stereo speaker balance |
| Soft mute attack timing | Low gain audio |
| Soft mute release timing | Low gain audio |

TABLE 1-continued

| Variable Component | Affects: |
|---|---|
| Soft mute with gain attenuation | Low gain audio |
| Click noise filters | Unwanted audio artifacts |
| Notch filters | Unwanted audio ranges |

It should be understood from the drawings and the description herein, that the variable components listed in Table 1 also have differing degrees of intensity that can be adjusted. More specifically, the High-cut attack timing can be adjusted to many differing levels. Therefore, there can be as many as 50 differing levels of High-cut attack timing, each defining a different variable component. Further, for each of the entries in Table 1, there can be a wide range of intensity for each variable component listed. Therefore, combinations of variable components that can be included in each compensation factor of the compensation factors CF-1 thru CF-N is almost infinite.

Hence, at step S22, the signal compensation section 86 can conceivably modify a segment of an audio broadcast in an infinite number of ways, thereby producing an almost infinite number of compensated audio performances.

At step S23 in FIG. 10, one at a time, each of the compensated audio performances is played for all the listeners L in the panel of evaluators 90 as a part of an overall evaluation process. Specifically, the compensated audio broadcasts are produced as compensated audio performances, one at a time, for at least one test listener L and preferably for a plurality of listeners L in the panel of evaluators 90.

At step S24, the feedback from the panel of evaluators 90 is collected as a further part of the evaluation process. Specifically, the panel of evaluators 90 provide their listener preference on which of the compensation factors CF-1 thru CF-N provided favorable compensation to the segment of the audio performance affected by signal degradation and which of the compensation factors CF-1 thru CF-N do not provide favorable compensation to the segment of the audio performance affected by signal degradation. It should be understood from the drawings and description herein, that the panel of evaluators 90 can provide varying levels of approval and dis-approval of the compensation factors CF-1 thru CF-N. The subsequent data collected in this feedback collecting step can include any number of levels of approval and dis-approval representing listener preference information.

The collecting of feedback and listener preferences in step S24 is further based upon comparing one of the plurality of compensated audio broadcasts with other audio broadcast of the plurality of compensated audio broadcasts. As the listener listens to each compensated audio broadcast, a comparison is being made between differing compensated audio broadcasts.

The evaluating of the compensated audio broadcast performed in step S24 can also include the grouping of specific categories of listeners L in the panel of evaluators 90. For instance, the playing of the compensated audio broadcasts can include playing the compensated audio performance for a specific group of listeners L or many different groups of listeners L. The groups of listeners L can be categorized by musical taste (musical categories), such as a group of classical music lovers, a group of rock music lovers, a group of country and western music lovers, and so on. The group of listeners L can also be categorized by geographical location, such as North American listeners, Central American listeners, Asian listeners, European listeners, and so on.

At step S25, the data collected in step S24 is used to determine at least one preferred signal degradation compensation factor based on the data from the evaluating of the compensated audio broadcasts. The determining step S25 can include using the listener preferences from all who participated in the panel of evaluators 90 or it is possible group the listeners by music genre and/or geographical location. The determining step S25 can also include performing a statistical analysis on the data corresponding to listener preference information. One method of analysis can include conducting conventional analytic hierarchy process and/or a pair-wise comparison.

Hence, it should be understood from the drawings and the description herein that one or a group of preferred signal degradation compensation factors can be identified using the above methodology. For example, a signal degradation compensation factor can be identified for groups of listeners divided by musical genre and/or groups of listeners divided by geographical location.

In preliminary experiments using the methodology described above, it has been found that popular music lovers prefer greater compensation in the segments of the audio performance that classical music lovers. Further, it has been found that groups of European listeners have differing listener preferences than groups of listeners from either Asia or North America. Consequently, the methodology described above are being used to identify current listener preferences and preferred signal degradation compensation factors for individual markets (for example, Asian, North American or European) and for different music genres (pop music, rock music, classical music, jazz music, Latin music and country music).

Therefore, in step S26 of FIG. 10, audio systems for specific markets can be manufactured with a signal compensation section 86 that is programmed specifically for that market. Specifically, audio systems for vehicles such as the vehicle 10 are manufactured and configured with the at least one preferred compensation factor of the compensation factors CF-1 thru CF-N identified in the determining step S25.

Further, the methodology represented in FIGS. 2 and 5 can be used to test groups of audio systems manufactured in accordance with the listener preferences identified using the methodology represented in FIG. 10.

The audio broadcast processing system 80 preferably includes a microcomputer with an audio management control program that controls the above described signal compensation section 86 and the feedback device 100. The audio broadcast processing system 80 can also include other conventional components such as an input interface circuit, an output interface circuit, and storage devices such as a ROM (Read Only Memory) device and a RAM (Random Access Memory) device. The microcomputer of the audio broadcast processing system 80 is programmed to control the signal compensation section 86 and the feedback device 100. The memory circuit stores processing results and control programs such as ones for audio broadcast processing system 80 operation that are run by the processor circuit. The internal RAM of the audio broadcast processing system 80 stores statuses of operational flags and various control data. The internal ROM of the audio broadcast processing system 80 stores various data and information for various operations. It will be apparent to those skilled in the art from this disclosure that the precise structure and algorithms for the audio broadcast processing system 80 can be any combination of hardware and software that will carry out the functions of the present invention.

The various components of the tuners and signal processors are conventional components that are well known in the art. Since these elements are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An audio broadcast processing method comprising:
processing an audio broadcast having at least one occurrence of signal degradation that adversely affects audio quality of a corresponding segment of the audio performance;
modifying the segment of the audio performance with a plurality of differing signal degradation compensation factors to selectively compensate for the at least one occurrence of signal degradation to produce a plurality of compensated audio performances;
evaluating the compensated audio performances including playing the compensated audio performances, one at a time, for at least one test listener, and collecting listener preference information that corresponds to the data;
determining at least one preferred signal degradation compensation factor based on data from the evaluating of the compensated audio performances; and
configuring an audio device with the at least one preferred signal degradation compensation factor.

2. The method according to claim 1, wherein the evaluating of the compensated audio performance includes comparing one of the plurality of compensated audio performances with other of the plurality of compensated audio performances.

3. The method according to claim 1, wherein the determining of the at least one preferred signal degradation compensation factor includes performing a statistical analysis on listener preference information.

4. The method according to claim 3, wherein the statistical analysis is conducted using an analytic hierarchy process.

5. The method according to claim 1, wherein the determining of the at least one preferred signal degradation compensation factor includes grouping the listener preference information by musical categories.

6. The method according to claim 1, wherein the determining of the at least one preferred signal degradation compensation factor includes grouping the listener preference information by geographical location.

7. The method according to claim 1, wherein the processing of the audio broadcast includes providing the audio broadcast with a predetermined fading pattern for a plurality of occurrences of signal degradation.

8. The method according to claim 1, wherein the modifying of the segment of the audio performance includes providing at least two variable components that compensate for the at least one occurrence of signal degradation for each of the plurality of differing signal degradation compensation factors, the variable components being selected from at least one of:
a high-cut with attack and release timing;
a high-cut with gain attenuation;
a stereo-blend with attack and release timing;
a stereo-blend with gain attenuation;
a soft mute with attack and release timing; and
a soft mute with gain attenuation.

9. The method according to claim 1, wherein the determining of the at least one preferred signal degradation compensation factor includes performing a statistical analysis on listener preference information received from the at least one test listener.

10. The method according to claim 9, wherein the statistical analysis is conducted using an analytic hierarchy process.

11. The method according to claim 1, wherein the playing of the compensated audio performances includes playing the compensated audio performance for a plurality of groups of test listeners that corresponds to the at least one test listener.

12. The method according to claim 11, wherein each of the groups of test listeners is divided by musical genre.

13. The method according to claim 11, wherein the processing of the audio broadcast includes providing the audio broadcast with a predetermined fading pattern for a plurality of occurrences of signal degradation.

14. The method according to claim 11, wherein
the modifying of the segment of the audio performance includes providing at least two variable components that compensate for the at least one occurrence of signal degradation for each of the plurality of differing signal degradation compensation factors, the variable components being selected from at least one of:
a high-cut with attack and release timing;
a high-cut with gain attenuation;
a stereo-blend with attack and release timing;
a stereo-blend with gain attenuation;
a soft mute with attack and release timing; and
a soft mute with gain attenuation.

15. The method according to claim 11, wherein
the determining of the at least one preferred signal degradation compensation factor includes performing a statistical analysis on listener preference information received from the at least one test listener.

16. The method according to claim 15, wherein
the statistical analysis is conducted using an analytic hierarchy process.

* * * * *